Dec. 18, 1962 G. J. RITTENHOUSE 3,068,906
JET ENGINE REFUELING HOSE
Filed Feb. 14, 1958

INVENTOR
GODFREY J. RITTENHOUSE
BY
ATTORNEY

United States Patent Office 3,068,906
Patented Dec. 18, 1962

3,068,906
JET ENGINE REFUELING HOSE
Godfrey J. Rittenhouse, Croydon, Pa., assignor to H. K. Porter Company Inc., Pittsburgh, Pa., a corporation of Delaware
Filed Feb. 14, 1958, Ser. No. 715,329
2 Claims. (Cl. 138—126)

This invention is directed to flexible hose for conducting fluids, more particularly to hose especially adapted for conveying organic liquids such as jet engine fuels and the like, without impairment through solvent or chemical action of the liquid.

In modern practice military and other aircraft jet engine fuel tanks are supplied with fuel through flexible hoses extending from a movable fueling truck equipped with the necessary pumps or other impelling means or from stationary equipment fed from underground conduits but the hoses heretofore available have generally had severely limited "on stream" capacity and short service life while difficult to manipulate when even reasonably sufficient in either of said respects.

Considerations of time demand that aircraft tanks particularly those of military planes be refueled as rapidly as possible and flexible fuel lines capable of delivering liquid fuel at the rate of 500 gallons per minute are within the minimum requirements of efficient operation according to present standards. Obviously, this requires a conduit of relatively large diameter to provide a suitable passage for the fuel within reasonable limits of pressure and flow velocity, while the chemical characteristics of such fuels, often containing highly reactive aromatic constituents, limit the materials of which the inner linings at least of the conduits can be made.

Buna N synthetic rubber is relatively inert chemically to and not soluble in jet engine fuels now in use but it is deficient in strength and other properties essential in fueling hoses. Efforts to use it as a lining for hoses of the order of 3" I.D. have been unsuccessful and while some relatively small diameter hoses lined with it have been reasonably satisfactory as to durability they are deficient in capacity. Thus, to deliver 500 g.p.m. fluid must flow through a 3" conduit at approximately 1375' per minute and four times that fast through a 1½" one and as frictional and other resistance to flow may be considered to vary roughly with the square of the velocity it is apparent that small bore hoses are inadequate to meet the aforesaid fueling requirements.

In accordance with my invention, however, fueling hoses of the order of 3" or more in internal diameter and durable considerably beyond the useful life of smaller hoses readily may be produced with consequent greater suitability than the latter for delivering jet engine fuel.

It is therefore a principal object of the invention to provide a novel flexible hose adapted for conveying jet engine fuel and the like in quantities of the order of 500 g.p.m. safely and without contaminating the fuel or allowing it to vaporize or escape.

Other objects, purposes and advantages of the invention will hereinafter more fully appear or will be understood from the following description in which reference will be had to the accompanying drawing, wherein.

Figure 1:
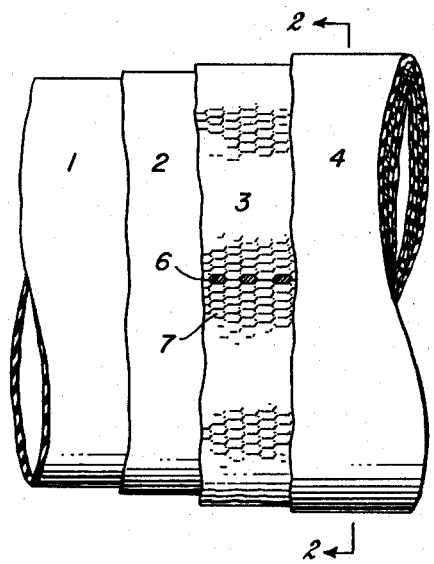
FIG. 1 is a fragmentary side elevation of a piece of my novel hose broken away to show the several plies of different materials comprised therein.
Figure 2:
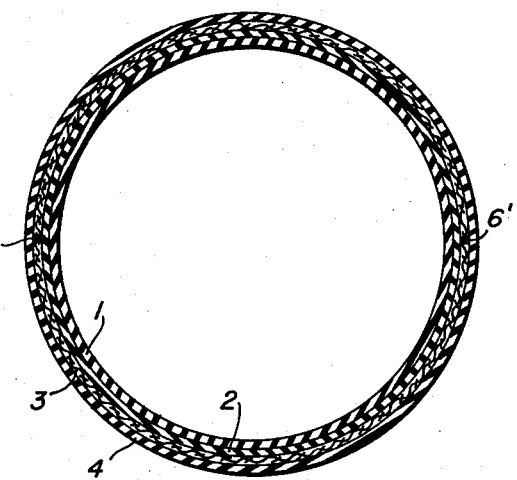
FIG. 2 is a transverse section on the line 2—2 in FIG. 1.
Figure 3:
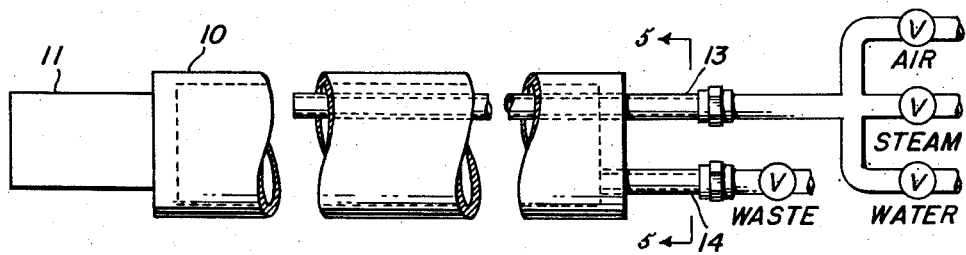
FIG. 3 is a fragmentary partly diagrammatic side elevation of a mandrel suitable to support the hose during its manufacture in accordance with my novel method.
Figure 4:
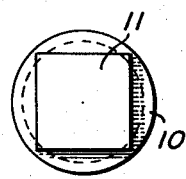
FIG. 4 is an end view thereof looking from the left in FIG. 3.
Figure 5:
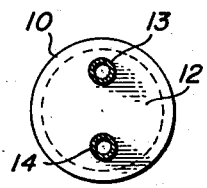
FIG. 5 is an opposite end view in which fluid conduits are illustrated in transverse section on the line 5—5 in FIG. 3.

Referring now more particularly to the drawing, the hose shown in FIGS. 1 and 2 comprises an inner tube 1 of buna N or comparable organic-solvent-insoluble elastomeric material to which is bonded an intermediate ply 2 of neoprene or comparable compatible elastomeric material overlaid by a fabric ply 3 made of woven "Dacron," a product of E. I. du Pont de Nemours & Company or similar polyester fiber yarn impregnated with neoprene or the like intimately bonded to the intermediate ply 2 and having an outer ply 4 of neoprene or the like in turn bonded to it and constituting an abrasion-resistant protective covering.

The term "bonded" and its cognates is herein used to denote an attachment between two components of specifically different chemical composition such that they do not yield to separation from each other without at least partial disintegration of one or both, and to distinguish from a mere adherence, with or without the interposition of an adhesive different in composition from both components, which permits them to be separated from each other substantially intact and unimpaired.

Flexible hose comprising inner and outer rubber plies with an intermediate textile fabric layer has been more or less standard in the industry for many years but the fabric layers of such hoses have generally been made from cotton fibers and the rubber layers from natural or synthetic materials which bond readily to it. Cotton fabrics, however, are lacking in strength and other properties of similar fabrics made from polyester fibers such as Dacron, while rubber and many other elastomeric materials lack resistance to aromatic and other organic solvents contained in jet engine fuels and the like. Buna N on the other hand, while resistant to such solvents, cannot be bonded directly to polyester fiber fabrics and efforts to use buna N linings in Dacron reinforced hose have thus resulted in imperfect bonding causing "blisters" or other defects in the hose passage which due to the relatively low strength characteristics of buna N may be torn loose from the fabric reinforcement when subjected to high velocity flow of liquid through the hose. Moreover, such blisters, even if they do not tear loose or rupture, interfere with free flow through the hose and impair its capacity to deliver the fuel at the required rate. Attempts have been made to effect suitable bonding by application of internal fluid pressure prior to and during curing but when buna N and Dacron are the materials used adequate bonding cannot be effected even in this way. It is known, however, that Dacron fabrics are subject to relatively high shrinkage under heating, and this property is availed of in accordance with my method in the manufacture of my novel hose.

The said method comprises extruding in the usual way a tube of uncured buna N for example of 3" I.D. which is preferably lightly dusted inside with soapstone powder or the like to prevent sticking and cut to lengths of, say, 50'–75'; the lengths then are consecutively subjected to a partial cure in a preheated vulcanizer, preferably one sufficiently long to accommodate the tubes without excessive, if any, folding. Prior to introduction to the vulcanizer one end of each tube is sealed, the tube partially inflated and the other end then sealed and before and during the introduction usual precautions are taken to prevent or remove wrinkles. Approximately 10 minutes are required, including time taken for insertion into and removal from the vulcanizer, to effect the desired partial cure with steam at 40 p.s.i. in the vulcanizer, i.e. at approximately 286.7° F., and following this partial curing the tube is deflated and at room temperature laid on an elongated strip of uncured neoprene or like synthetic elastomer preferably about .040" in thickness when the wall thickness of the buna N tube is about .085".

The neoprene strip is then wrapped around the tube to which it lightly adheres, care being taken to insure cleanliness of the meeting surfaces and that all air is excluded from between them to insure prefect contact, the longitudinal edges of the strip preferably meeting in a "butt" joint. If the now 2-ply tube is to be coiled and stored it may be dusted lightly with soapstone powder or the like to prevent sticking, but if it is to be further processed at once this may not be necessary.

Such further processing includes passing the tube axially into a previously prepared woven fabric tube of approporiate diameter made from Dacron or similar polyester fiber yarn in the manner commonly employed for making cotton reinforcing jackets for fire hoses and the like, it being advisable the fabric tube have woven into it two diametrically opposed strands of braided copper wire 6, 6' paralleling its warp yarns 7 to provide grounding conductors in the finished hose for discharging static electricity in service. Preferably the fabric tube or jacket is impregnated with neoprene cement and allowed to dry before the composite elastomeric tube is introduced, and after all wrinkles, blisters and the like have been eliminated, care being taken to correct any axial twisting of either component, the assembly is then disposed on a cylindrical mandrel 10 which has first been treated with a "mold release" composition to prevent adherence to it of the buna N tube. This mandrel, which is hollow and has welded to it a squared closure 11 at one end and a circular plate 12 at its other receiving an inlet pipe 13 and an exhaust pipe 14, is preferably of a diameter snugly to fit within the buna N tube; within the mandrel the inlet pipe 13 desirably extends to a point about 2½' short of the end closure 11 in an 80' mandrel and a proportionate distance in mandrels of other lengths. Following these operations valve controlled connections are made with inlet pipe 13 and exhaust pipe 14 to permit selective introduction of air, steam or water through the former and fluid discharge through the latter and the ends of the tube are temporarily secured to the mandrel with friction tape or the like.

Steam then is admitted at 100 p.s.i. to heat the mandrel and hence the jacketed tube to a corresponding temperature, approaching about 325° F., which is maintained until the Dacron jacket has shrunk sufficiently to firmly constrict the elastomeric lining plies against the mandrel and to extrude some of the neoprene outer ply into and through the interstices in the jacket. This heating is normally insufficient to cure the elastomeric materials, however, which consequently readily yield to the constriction of the jacket resulting from its shrinkage; the inner wall of the buna N inner tube is thus conformed to the smooth outer cylindrical surface of the mandrel.

When shrinkage of the jacket has effected a substantially uniform extrusion of the neoprene ply into its interstices further heating by steam is discontinued and cold water is run into the mandrel to cool it slightly followed by air under pressure to discharge the water while the mandrel and jacketed tube are still fairly warm, whereupon a coating of neoprene cement or the like is applied to the outer surface of the jacket and allowed to dry, the residual heat from the previous steam injection accelerating the normal drying time of the cement by volatilization of its solvent. An outer layer comprising a strip of uncured neoprene or the like about .075" thick is now applied, and a butt joint formed between its edges in any convenient way to completely enclose the jacket following which the entire assembly is spirally wrapped with two plies of strong tape, for example 2¼" woven nylon yarn tape, applied under considerable tension in the manner common in the industry. For example, with the mandrel disposed on suitable rollers and a rotating chuck connected to the squared end of its closure 11 an operative may progressively feed the tape at a small angle to the mandrel axis under manually controlled tension as he passes from one end of the mandrel to the other and returns, the mandrel pipes 13 and 14 of course being disconnected during the operation.

After the wrapping has been completed the said pipes are reconnected and steam at 100 p.s.i. admitted for completing the cure of all the elastomeric components of the hose, an operation normally requiring about 90 minutes; the steam is then shut off, cold water introduced to cool the mandrel and hose to room temperature, and finally air to discharge residual water. Next, the pipes are again disconnected and the nylon tape wrapping removed before stripping the cured and finished hose from the mandrel.

If metallic couplings or other fittings are ultimately attached to the hose ends, which may first have to be squared off, precautions are advisable to insure their good electrical contact with the grounding wires 6, 6' woven into the fabric reinforcement, these of course constituting no part of the invention.

It will be evident to those skilled in the art from the foregoing description of the manufacture of my hose that it comprises a smooth substantially perfectly cylindrical inner lining of buna N pressure bonded to an overlying neoprene ply in turn securely bonded under like pressure to the Dacron reinforcing ply with the outer covering of the latter bonded to it under the considerable pressure of the nylon tape, preferably applied wet to take advantage of its shrinkage on drying during heating. Thus the buna N lining provides adequate resistance to attack by the constituents of jet engine fuels and the like while the Dacron reinforcement affords adequate strength to withstand bursting pressures up to 900 p.s.i., the outer neoprene cover primarily functioning to prevent abrasion damage to the subjacent fabric reinforcing ply.

This hose in the nominal 3" size has been found capable of delivering up to 500 g.p.m. of jet engine fuel and when used for defueling under suction as high as 8" Hg permits passage of 90 g.p.m. event though it then may be partially collapsed especially in long section.

In production of this hose it is advisable certain precautions well recognized in the industry be observed. For example, in making the longitudinal butt joints between the edges of the neoprene strips forming plies 2, 4 a hand roller (not shown) may be employed to assist in excluding air bubbles and blisters and ensuing intimate contact of such edges, which may be made precisely complementary by initially providing a strip somewhat wider than required, lapping one edge over the other, and then cutting or "skiving" off the excess material. Likewise if the awl or the like be used plies care should be exercised to avoid also puncturing the adjacent inner ply, particularly when this is the innermost ply 1 or buna N, which if it be punctured may later fail at the site of the puncture notwithstanding subsequent curing.

By providing a relatively long mandrel such as one 80' in length, I find it entirely practical to produce single unitary hose sections substantially of corresponding length which are adequate for most purposes. But when such a mandrel is used and particularly when it is supported during the curing of the hose from a few roller blocks spaced along its length it is advisable to dispose suitable padding on the blocks to obviate undesirable roller marks in the hose cover. Moreover the nylon tape with which the hose is wrapped during curing forms a textured surface on the latter, and to avoid appearance of blemishes in this surface I prefer, when it is inconvenient to use a single piece of nylon tape for the entire inner temporary wrapping, to lap two pieces together for several turns about the hose rather than to use two or more pieces sewn together end to end, since the thickening of the tape at a sewn joint may cause a corresponding depression or other noticeable mark on the outer surface of the finished product.

While I have herein described my invention as directed primarily to the provision of hose suitable for refueling jet engines it will be apparent its end use is not restricted to that service, the hose being capable of conducting fluids of many kinds without being injured thereby, and while the maximum internal pressure it is capable of withstanding will seldom if ever be exerted upon it under service conditions its excess capabilities in this regard provide an edaquate margin of safety practically to eliminate "blow-outs" while in use, its abrasion resistant outer cover, moreover, affording a long service life under conditions conducive to mechanical injury to fabric covered hoses.

Furthermore, while I have mentioned buna N, neoprene and Dacron as components of my hose these designations are to be understood merely as convenient ones facilitating disclosure of the properties of the materials advisable for use in making hose for conducting present day jet engine fuels. Consequently when hose resistant to the action of other liquids is required selection may be made from available elastomeric materials resistant thereto for production of the inner ply 1 and a material capable of effectively bonding with it and the fabric ply 3 for the intermediate ply 2. Consequently the composition of the latter if other than Dacron will somewhat control the specific material employed for the intermediate ply 2, it being essential that the fabric ply afford adequate strength for reinforcement, be capable of being bonded with the intermediate ply 2 and have suitable shrinkage under heating for insuring bonding together of plies 1, 2 and 3, the outer covering of course bonding with the fabric of the reinforcing ply.

Therefore while practice of the invention has herein been described with considerable particularity in respect to production of hose for service in delivering present jet engine fuels, it will be understood it is not to be deemed as thereby limited or confined thereto in any way as changes in the materials employed and in the specific operations utilized for transforming them into a flexible hose will readily occur to those skilled in the art and may be made if desired without departing from the spirit and scope of the invention as defined in the appended claims.

Having thus described my invention, I claim and desire to protect by Letters Patent of the United States:

1. A flexible hose comprising an inner tubular layer of an elastomeric composition inert to the chemical and solvent action of the fluid to be directed through the hose, and resistance in its normal state to bonding to heat shrinkable textile fiber fabric, an intermediate layer, of elastomeric compostion non-resistant to such bonding integrally bonded to said inner layer, a reinforcing layer overlying the intermediate layer and comprising a woven fabric containing yarns of heat shrinkable textile fibers bonded to the intermediate layer with portions of the material of said layer extending into interstices in the fabric, and an outer elastomeric layer overlying the reinforcing layer, intimately bonded thereto and projecting into said interstices therein into bonded relationship with said portions, said elastomeric materials being polymerized.

2. A flexible hose comprising an inner ply of elastomeric material resistant to the action of constituents of jet engine fuels and to bonding with heat-shrinkable textile fibers, an intermediate ply of elastomeric material bonded to said inner ply and to an outer heat-shrinkable fabric reinforcing ply, said last mentioned ply containing warp yarns extending parallel to the hose axis, filler yarns spirally interwoven therewith, and portions of the intermediate ply projecting into interstices between said warp and filler yarns, and an outer cover comprising a relatively abrasion resistant elastomeric material bonded to the outer surface of said reinforcing ply, said elastomeric materials being polymerized.

References Cited in the file of this patent

UNITED STATES PATENTS

| | | |
|---|---|---|
| 834,074 | Patterson | Oct. 23, 1906 |
| 1,152,836 | Price | Sept. 7, 1915 |
| 1,972,755 | Blaisdell | Sept. 4, 1934 |
| 1,997,618 | Williamson | Apr. 16, 1935 |
| 2,383,733 | Parker | Aug. 28, 1945 |
| 2,512,433 | Leben | June 20, 1950 |
| 2,595,127 | Coffey | Apr. 29, 1952 |
| 2,653,887 | Slayter | Sept. 29, 1953 |
| 2,703,774 | Morrison | Mar. 8, 1955 |
| 2,764,506 | Piccard | Sept. 25, 1956 |
| 2,783,173 | Walker et al. | Feb. 26, 1957 |
| 2,833,313 | Penman | May 6, 1958 |
| 2,888,954 | Gates | June 2, 1959 |
| 2,903,016 | Cobi | Sept. 8, 1959 |

FOREIGN PATENTS

| | | |
|---|---|---|
| 124,898 | Australia | Sept. 5, 1947 |